US 8,924,540 B2

(12) United States Patent
Knaggs et al.

(10) Patent No.: US 8,924,540 B2
(45) Date of Patent: Dec. 30, 2014

(54) TELECOMMUNICATION ENERGY MANAGEMENT SYSTEM

(75) Inventors: David Knaggs, Spokane, WA (US); Paul A. Knight, Spokane, WA (US); Randolph Stanton Wright, Lucas, TX (US); Larry O'Neal Reeder, Rockwall, TX (US); Bryan Joseph Kioski, Spokane, WA (US)

(73) Assignee: Telect, Inc., Liberty Lake, WA (US)

( * ) Notice: Subject to any disclaimer, the term of this patent is extended or adjusted under 35 U.S.C. 154(b) by 706 days.

(21) Appl. No.: 13/094,655

(22) Filed: Apr. 26, 2011

(65) Prior Publication Data

US 2012/0278723 A1    Nov. 1, 2012

(51) Int. Cl.
*G06F 15/16* (2006.01)
*G06F 15/173* (2006.01)
*H04L 12/24* (2006.01)
*H04L 29/08* (2006.01)

(52) U.S. Cl.
CPC .............. *H04L 67/025* (2013.01); *H04L 41/22* (2013.01); *H04L 67/36* (2013.01); *H04L 41/0213* (2013.01)
USPC ........... 709/224; 709/201; 709/202; 709/203; 709/223

(58) Field of Classification Search
USPC .................. 709/223, 234, 201, 202, 203, 224
See application file for complete search history.

(56) References Cited

U.S. PATENT DOCUMENTS

| | | | |
|---|---|---|---|
| 5,546,300 A | 8/1996 | Lee et al. | |
| 5,949,974 A | 9/1999 | Ewing et al. | |
| 6,230,203 B1* | 5/2001 | Koperda et al. | 709/229 |
| 6,457,038 B1 | 9/2002 | Defosse | |
| 6,571,140 B1* | 5/2003 | Wewalaarachchi et al. | 700/83 |
| 6,624,532 B1 | 9/2003 | Davidow et al. | |
| 6,629,151 B1* | 9/2003 | Bahl | 709/250 |
| 7,162,521 B2 | 1/2007 | Ewing et al. | |
| 7,251,570 B2* | 7/2007 | Hancock et al. | 702/57 |
| 7,271,502 B1* | 9/2007 | Remaker | 307/38 |
| 8,375,118 B2* | 2/2013 | Hao et al. | 709/223 |
| 2003/0040897 A1* | 2/2003 | Murphy et al. | 703/18 |
| 2004/0107284 A1* | 6/2004 | Koperda et al. | 709/229 |
| 2005/0116836 A1 | 6/2005 | Perry et al. | |
| 2006/0056370 A1* | 3/2006 | Hancock et al. | 370/338 |
| 2006/0265489 A1* | 11/2006 | Moore | 709/223 |
| 2006/0271214 A1 | 11/2006 | Brown | |

(Continued)

FOREIGN PATENT DOCUMENTS

WO    WO2009149078    12/2009

OTHER PUBLICATIONS

"PowerBay Medium Current BDFB Power Distribution Systems", Comm/net Systems, Datasheet Document 048-102-00, Rev.1, May 2010, pp. 1-4.

(Continued)

*Primary Examiner* — Edward Kim
(74) *Attorney, Agent, or Firm* — Lee & Hayes, PLLC

(57) ABSTRACT

A telecommunication energy management system comprising a server configured to receive circuit current values identified with a respective piece of telecommunication equipment from a plurality of central boards located at respective telecommunication sites. The server integrates the received circuit current values and provides a graphical user interface (GUI) to allow a user to audit energy usage of each piece of telecommunication equipment of each telecommunication site.

20 Claims, 8 Drawing Sheets

(56) References Cited

U.S. PATENT DOCUMENTS

| | | |
|---|---|---|
| 2009/0234757 A1 | 9/2009 | Tarbell et al. |
| 2010/0161148 A1* | 6/2010 | Forbes et al. ................. 700/295 |
| 2010/0228854 A1 | 9/2010 | Morrison et al. |
| 2010/0332373 A1* | 12/2010 | Crabtree et al. ................. 705/37 |
| 2011/0202910 A1* | 8/2011 | Venkatakrishnan et al. .. 717/171 |
| 2012/0130513 A1* | 5/2012 | Hao et al. ........................ 700/90 |

OTHER PUBLICATIONS

The PCT Search Report mailed Nov. 29, 2012 for PCT application No. PCT/US12/34824, 14 pages.

Office action for U.S. Appl. No. 13/094,631, mailed on Aug. 1, 2013, Knaggs et al., "Telecommunication Wireless Control System", 7 pages.

* cited by examiner

TELECOMMUNICATION ENERGY MANAGEMENT SYSTEM

TECHNICAL FIELD

This application relates to systems and methods of managing energy usage in a telecommunications network infrastructure.

BACKGROUND

Telecommunications processes, equipment and devices consume large amounts of power primarily due to ever increasing customer demands for digital communications versus analog communications. With the increase of consumption of large amounts of power, systems and methods for energy management in the telecommunications network infrastructure are desired by telecommunications organizations. For example, telecommunications organizations may desire to monitor and/or control power consumption by each telecommunication equipment arranged in telecommunication sites within a telecommunications network infrastructure.

Existing energy monitoring methods are very coarse. For instance, energy management systems and methods have traditionally been utilized at a site level (e.g., a central office site or a wireless site). For example, a telecommunication organization may simply monitor energy consumption of a single site by way of regularly comparing the site's utility bills from month to month. While this approach helps ensure that the telecommunication site's energy consumption is at least consistent, it does not provide visibility to power consumption by each piece of telecommunication equipment arranged in the telecommunication site.

As such, telecommunications companies are beginning to monitor power consumption at a power distribution system level. Specifically, telecommunications companies are beginning to monitor power consumption at a primary power distribution level (e.g., a battery distribution feeder bay (BDFB)). For example, a telecommunications company may monitor energy consumption of a primary power distribution system by monitoring a current shunt monitor of the primary power distribution system. While this approach provides visibility to power consumption at the primary power distribution level, it also does not provide visibility to power consumption by each piece of telecommunication equipment arranged in the telecommunication site.

Furthermore, a telecommunication company's ability to individually control each piece of telecommunication equipment disposed at remote wireless sites is also desired by telecommunication companies. For example, today's telecommunication companies may be capable of controlling a remote wireless site's radios. However, a telecommunication organization may desire to control not only a radio, but also control the additional telecommunication equipment disposed at the remote wireless site. Having the ability to control an entire wireless site system, including additional telecommunication equipment, would provide a telecommunication organization the ability to reduce a remote wireless site's operating costs. More specifically, today's remote wireless telecommunication sites do not provide a central control system capable of controlling each telecommunication equipment, power device(s), and/or controller(s) disposed at the remote wireless site. Instead, a network operations center (NOC) may simply control each individual radio through a communication channel.

In addition, a telecommunication organization may desire to monitor and manage energy usage of telecommunication equipment across an entire telecommunication network infrastructure. For example, a telecommunication organization may monitor and manage energy consumption by comparing one site's energy consumption with another site's energy consumption. Some telecommunication organizations may even monitor and manage energy consumption of primary power distribution systems across multiple telecommunication sites. While these approaches may provide visibility to energy consumption at the telecommunication site level or even to a primary power distribution level, it does not provide visibility to energy consumption by each piece of telecommunication equipment arranged across the entire telecommunication network infrastructure.

Accordingly there remains a need in the art for individual telecommunication equipment current monitors and remote wireless telecommunication site controllers. Similarly, there remains a need in the art for a central server that is in communication with each individual telecommunication equipment current monitor and each telecommunication site controller to provide management capabilities of energy consumption by each piece of telecommunication equipment arranged across the entire telecommunication network infrastructure.

SUMMARY

This summary is provided to introduce simplified concepts for a telecommunication infrastructure energy management system and method, which is further described below in the Detailed Description. This summary is not intended to identify essential features of the claimed subject matter, nor is it intended for use in determining the scope of the claimed subject matter.

In one example, a server may receive data from a plurality of central boards located at respective telecommunication sites. The data may comprise a plurality of reported circuit current values, each of which may be identified with a respective telecommunication equipment. The server may then integrate the received data. The server may also provide a graphical user interface (GUI) that may be configured to allow a user to audit energy usage of each telecommunication equipment of each telecommunication site.

In another example, a telecommunication network infrastructure energy management server may provide an approved standard telecommunication equipment list to each of a plurality of central boards located at a respective telecommunication site. Each of the approved standard telecommunication equipment lists may be tailored for a respective telecommunication site.

In another example, one or more computer-readable media may comprise computer-executable instructions to perform acts similar to those performed by the telecommunication network infrastructure energy management server.

BRIEF DESCRIPTION OF THE DRAWINGS

The detailed description is described with reference to the accompanying figures. The use of the same reference numbers in different figures indicates similar or identical items.

DETAILED DESCRIPTION

Overview

Figure 1:
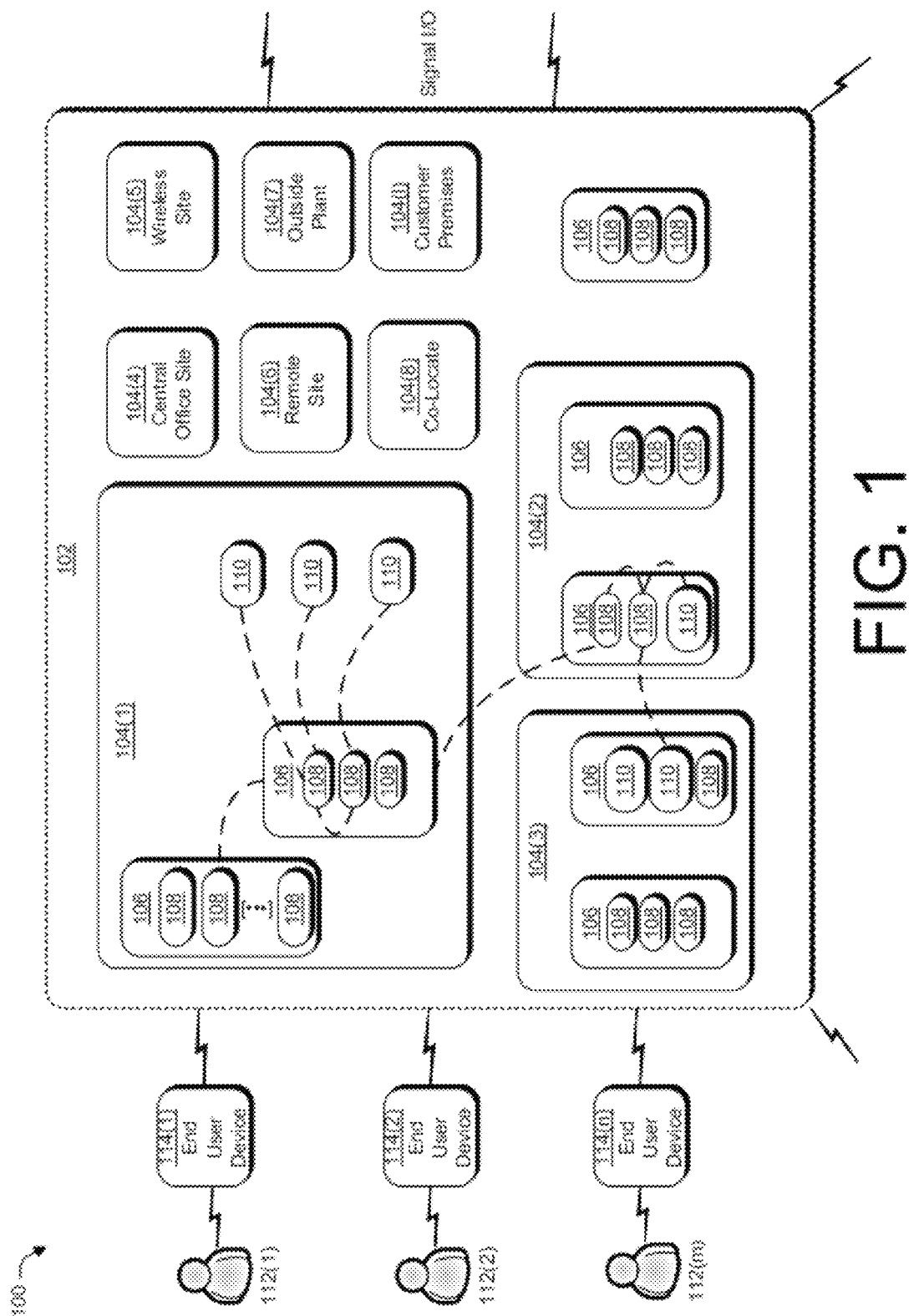
FIG. 1 illustrates an example environment for a telecommunications system including a central office site and a wireless site.

This disclosure is directed to a telecommunication monitoring system and method, a telecommunication central control system and method, and a telecommunication infrastructure energy management system and method. In some of the monitoring system implementations, a Hall effect current monitor may be configured to monitor and report a current flowing through a piece of telecommunication equipment that the Hall effect current monitor is identified with. In some of the central control system implementations, a central control board may be disposed at a wireless site to receive control signals to control each telecommunication equipment, power device(s), and/or controller(s) disposed at the remote wireless site. In some of the telecommunication infrastructure energy management system and method implementations, a server may receive a plurality of reported current values for respective telecommunication equipment located at a respective telecommunication sites, and provide a GUI to audit energy usage across the telecommunication network infrastructure.

Traditional telecommunication energy monitoring systems have monitored energy consumption at the telecommunication site level. For example, a telecommunication organization may simply monitor energy consumption of a single site (e.g., a central office or a remote wireless site) by way of regularly comparing the site's utility bills. In other instances, meanwhile, some telecommunications companies monitor power consumption at a primary power distribution level (e.g., a battery distribution feeder bay (BDFB)) by monitoring a current shunt of the primary power distribution system. Because traditional monitoring systems and methods simply monitor a total power consumption of either an entire telecommunication site or of a battery distribution feeder bay, they are not capable of monitoring a power consumption by each single piece of telecommunication equipment and, therefore, are unable to perform trend analysis with respect to each single piece of telecommunication equipment's power consumption.

For example, traditional monitoring systems and methods are not able to determine if a certain piece of telecommunication equipment is drawing more current that it should be or if there are potential maintenance issues with the piece of telecommunication equipment. Further, traditional monitoring systems and methods are not able to compare one telecommunication equipment's power consumption with a second and potentially same type of telecommunication equipment's power consumption. Having the ability to monitor power consumption of each single piece of telecommunication equipment may reduce costly unexpected telecommunication equipment failures. In addition, having the ability to monitor power consumption of each piece of telecommunication equipment will allow for optimization of a telecommunication site's infrastructure and reduce power consumption.

Traditionally, with respect to telecommunication control systems, a network operations center (NOC) may control individual radios at a remote wireless site through a communication channel. However, today's telecommunication sites may have power devices (e.g., rectifiers and generators) that now come with a smart controller that allows for controlling the power devices. Telecommunication sites may also have thermal regulators capable of turning heating and cooling systems on and/or off based on a temperature of the telecommunication site. Some telecommunication sites may be able to turn on and/or off loads based on logic settings in a power device (i.e., a rectifier). While a traditional telecommunication wireless site may be capable of controlling a radio remotely, self regulate its temperature, and self regulate power devices, traditional telecommunication wireless sites do not have a central control board and, therefore, are unable to remotely control each piece of telecommunication equipment, power device, and thermal regulator disposed at the wireless site.

For example, traditional telecommunication wireless sites are not able to receive inputs (e.g., alarms and/or status information) at a central control board from various telecommunication components (e.g., thermalelectric coolers, heat exchangers, generators, solar panels, wind turbines, rectifiers, radio inputs, battery systems, breaker panel, fuse panels, or the like) and control the various telecommunication components remotely. Further, traditional telecommunication wireless sites have limited ability to connect with the NOC. For example, some traditional telecommunication wireless sites may only have a single telephone line they can interface with, while other traditional wireless sites may not have a connection unless a wireless modem is installed. Further, some traditional telecommunication wireless sites may only have a single Ethernet interface available. Having the ability to control remotely each single piece of telecommunication equipment, each power device, and each thermal regulator at a remote wireless site may reduce operating expenses for a wireless carrier. In addition, implementing a remote wireless site that has the ability to connect with a NOC may also reduce operating expenses for a wireless carrier.

Traditionally, telecommunication organizations do not employ a central server capable of managing energy usage of each piece of telecommunication equipment across a telecommunications infrastructure network. Traditional telecommunication organizations also do not employ a central server connected with telecommunication sites to provide a configured list of company standard telecommunication equipment to each telecommunication site for associating each piece of telecommunication equipment with its own circuit. Further, traditional telecommunication organizations have limited ability to view and audit energy usage data and do not have a graphical user interface (GUI) to provide external auditors or internal company personnel to easily view and audit energy usage of each telecommunication equipment across a telecommunications infrastructure network. For example, some traditional telecommunication organizations may only have a graphical display of information and some logging. Having the ability to view and audit energy usage of each piece of telecommunication equipment across a telecommunications infrastructure network on a GUI may reduce operating expenses for a telecommunication company.

Accordingly, this disclosure describes systems and methods for monitoring, controlling, and managing each telecommunication equipment across a telecommunications infrastructure network, which may result in a reduction of operating expenses for today's higher power consuming digital telecommunications network. To achieve these systems, in one example this application describes a telecommunication central office site having a monitoring system configured to monitor a current flowing through each piece of telecommunication equipment arranged in the telecommunication central office site. In another example this application describes a telecommunication wireless site having a control system configured to control and monitor each piece of telecommunication equipment and each power device arranged in the telecommunication wireless site. In another example this application describes a telecommunication network infrastructure management server communicatively coupled with the monitor systems arranged at the telecommunication central office sites and control systems arranged at the telecommunication wireless sites.

The monitor system arranged in the telecommunication central office site has a central monitoring board communicatively coupled with a current monitoring board. The current monitoring board may be disposed in a primary power distribution system and/or may be disposed in a secondary power distribution system. The current monitor board being communicatively coupled with a current monitor. The current monitor may be configured to monitor a current flowing through a circuit breaker of a piece of telecommunication equipment and/or a current flowing through a fuse of a piece of telecommunication equipment. Each current monitor being identified with each piece of respective telecommunication equipment. Thus, the communicatively coupled central monitoring board, current monitoring board, and current monitor, report each current flowing through each piece of telecommunication equipment arranged in the central office site, thereby increasing resolution of energy usage at the central office site. In some implementations the primary power distribution system is a battery distribution feeder bay (BDFB) and the secondary power distribution system is a fuse panel or any other power protection system. In another implementation, the single current monitor comprises a Hall effect current monitor.

Because these monitoring systems arranged in telecommunication central office sites monitor energy usage of individual pieces of telecommunication equipment arranged in the central office site, a more finely detailed data is provided. This allows for trend analysis and tracking purposes. For example, because energy usage of individual pieces of telecommunication equipment is monitored, a central database (e.g., a central server) may track energy usage of each telecommunication equipment and determine where an error had been made assigning the equipment type to an individual circuit based Specifically, a server may determine that an energy usage of a specific type of telecommunication equipment is much higher and/or lower than the specification for the specific type of telecommunication equipment calls for.

The control system arranged in the telecommunication wireless site has a central control board communicatively coupled with a primary board. The primary board may be disposed in a primary power distribution system, and may communicatively couple with a current monitor and control board. The current monitor and control board includes a current monitor and a switch and may be configured to monitor a current flowing through a circuit breaker of a piece of telecommunication equipment and/or a current flowing through a fuse of a piece of telecommunication equipment. The switch may be configured to open and/or close based on a control signal received from the central control board. Further, each current monitor and control board may be identified with each respective telecommunication equipment. For example, a telecommunication equipment may be assigned to a current monitor and control board via a standard telecommunication equipment list. Thus, the central control board is configured to receive control signals to control each telecommunication equipment arranged in the wireless site and to receive inputs from each piece of telecommunication equipment arranged in the wireless site, thus allowing more informed decisions to be made regarding power and thermal management at the wireless site.

In some implementations an extension board is electrically coupled with a controller (e.g., an LVD controller or a thermal controller). The extension board is communicatively coupled with the central control board and may control a controller based on a control signal received from the central control board. In some implementations, the extension board is communicatively coupled with the central control board via an RS-485 communications standard. In another implementation, the central control board comprises a LAN port communicatively coupled with a local switch. The local switch may include a port communicatively coupled with a power device (e.g., a rectifier or a generator) and may be configured to control the power device based on a control signal received from the central control board.

Because these control systems arranged in telecommunication wireless sites receive inputs from each of the various telecommunication components within the site, and because the control systems receive control signals for each of the various telecommunication components remotely, each telecommunication component may be controlled remotely. Thus, by controlling each telecommunication component arranged in a telecommunication wireless site, the total energy consumption of a telecommunication wireless site may be balanced and/or made to consume energy more efficiently. Thus an operating expense of wireless sites can be reduced for a wireless carrier.

The management system manages energy usage of a telecommunication network infrastructure and aggregates data from across multiple telecommunication sites (i.e., central office sites and wireless sites). The management system has a central server to receive data from a plurality of central monitoring boards located at telecommunication sites. The data comprising reported current values, each respectively identified with a piece of telecommunication equipment. The central server may create and serve to a user device a graphical user interface (GUI) configured to allow a user to audit energy usage of each telecommunication equipment of each telecommunication site, audit servicing of telecommunication equipment of each telecommunication site, and audit assets of each telecommunication site. Thus, the server may have a database that stores aggregated data from across the multiple telecommunication sites useable with a GUI to perform audits. In some implementations, the server provides an approved standard telecommunication equipment list to each central board located at a respective telecommunication site. Each of the approved standard telecommunication equipment lists may be tailored to respective telecommunication sites. In some implementations the data further comprises alarm signals and/or a status signal of power management devices (e.g., rectifiers and/or generators). In another implementation, the data further comprises a status signal of a control device (e.g., a LVD and/or a thermal control).

Because these management systems aggregate data from each telecommunication equipment of each telecommunication site across a telecommunication infrastructure network and provides a GUI to audit the aggregated data, a total energy consumption of each telecommunication wireless site, as well as servicing of each telecommunication wireless site may be audited. Thus, operating expenses of telecommunication sites can be reduced for a telecommunication organization.

While the illustrated embodiments show primary power distribution panels and secondary power distribution panels comprising breakers and/or fuses, the breakers and fuses may be of any type of power protection devices suitable for use in DC telecommunications power systems. For example the breakers and/or fuses may be TPS, TLS, breakers, KTK, KLM, TPC, GMT "grasshopper" type power protection devices. Further, the primary power distribution panels and secondary power distribution panels described herein may be configured to utilize −48 VDC, +24 VDC, or other voltages, suitable for powering telecommunications equipment.

Example Environment

FIG. 1 illustrates an example implementation of an environment 100 operable to provide a telecommunications network in which the apparatuses and procedures of the present disclosure may be employed. The environment 100 includes at least a portion of a telecommunication network infrastructure 102 (hereinafter "infrastructure"). Infrastructure 102 provides telecommunications processes, structures, equipment and devices between end-user devices such as modems, phones, facsimile devices, and so on used by end-users outside of the infrastructure 102 to communicate via a telecommunications network. Within infrastructure 102 a variety of equipment, apparatus and devices are utilized in routing, processing, distributing signals, and distributing power. Telecommunications signals and data may be processed, switched, routed, tested, patched, managed, or distributed by various pieces of equipment in the infrastructure 102. Infrastructure 102 may include fiber, copper and or other types of communication cabling and transmission media utilized in routing, processing, and distributing telecommunications signals.

A variety of sites 104(1)-104(L) within infrastructure 102 may maintain various equipment used in the infrastructure 102. Sites 104 may be locations within infrastructure 102 which hold a variety of structures and equipment to facilitate processing and distributing of telecommunications signals. The equipment may be centralized in one site (e.g., site 104(1)) or dispersed throughout different sites 104 in infrastructure 102. In other words, interconnections may be made between various sites 104 in infrastructure 102, as shown, for example, by the connection denoted in FIG. 1 by a dashed line between site 104(1), 104(2), and 104(3). Naturally, numerous interconnections between a plurality of sites 104 may be made. The numerous interconnections between the plurality of sites may include a power distribution interconnection to each of the sites. As depicted in FIG. 1, infrastructure 102 may have numerous sites 104 which may be different physical locations within infrastructure 102 such as a central office site 104(4), a wireless site 104(5), a remote site 104(6), an outside plant site 104(7), a co-locate site 104(8), any other site utilized by infrastructure 102.

Each site 104 may have one or more housings 106 having a plurality of components 108. A housing 106 may be configured in a variety of ways to maintain or hold a plurality of components 108 in infrastructure 102. For example, a housing 106 may be configured as a housing for a primary power distribution panel (e.g., a BDFB), a secondary power distribution panel (e.g., a fuse panel) a cabinet, a terminal block, a panel, a chassis, a digital cross-connect, a switch, a hub, a rack, a frame, a bay, a module, an enclosure, an aisle, or other structure for receiving and holding a plurality of components 108. Hereinafter, the terms housing and cabinet will be used for convenience to refer to the variety of structures in infrastructure 102 that may hold components 108.

Housing 106 may be situated in a variety of locations, such as inside a building or placed outside. Housings 106, for example, may be configured to protect components 108 from environmental influences when inside or outside. FIG. 1, for instance, depicts site 104(1) as having two housings (e.g., cabinets) 106, each having a plurality of components 108. Other housings 106 may be included throughout infrastructure 102 at sites 104 as shown, for example, by housings 106 depicted within site 104(2).

Components 108 are pieces of telecommunications equipment in infrastructure 102 that may be kept or maintained in a housing 106 (e.g. cabinet) within the infrastructure 102. Components, for example, may be cross-connect panels, modules, splitters, combiners, terminal blocks, chassis, backplanes, switches, digital radios, repeaters, and so forth. Components 108 may be those devices utilized for processing and distributing signals in infrastructure 102 and which may be maintained in a housing 104. Components 108 may be those devices for distributing, controlling, and monitoring power. For example components may be primary power distribution panels, secondary power distribution panels, central monitor boards, central control boards, local switches, rectifiers, generators, main buses, LVD controllers, thermal controllers, battery systems and so forth.

Network elements 110 are pieces of telecommunications equipment that may be implemented in a variety of ways. For example, network elements 110 may be configured as fiber optic equipment, switches, digital cross connect (DSX) systems, telecommunication panels, terminal blocks, digital radios, network office terminating equipment, and any other telecommunication equipment or devices employed in a telecommunications infrastructure 102. Network elements 110 may be found within a cabinet 106 as a component 108 of the cabinet.

The environment 100 depicts a plurality of end users 112(1)-112(M) which may be communicatively coupled, one to another, via a telecommunication network including infrastructure 102. End users 112 may refer to a variety of users, such as consumers, business users, internal users in a private network, and other types of users that use telecommunications signals or transmit and receive telecommunications signals via client devices. Additionally, for purposes of the following discussion clients 112(1)-112(M) may also refer to the client devices and software which are operable to transmit and receive telecommunications signals. Thus, clients 112(1)-112(M) may be implemented as users, software and/or devices.

The interconnection of pieces of equipment (e.g. cabinets 106, components 108 and network elements 110, and so forth) provides signal pathways between equipment for signals input to and output from infrastructure 102. For example, end-users 112(1)-112(M) may send signals into the infrastructure 102 and receive signals output from the infrastructure using a variety of end user devices 114(1)-(N) (e.g., a telephone, mobile phone, or the like). End user 112(1), for instance, may communicate with end user 112(M) via end-user devices 114(1) and 114(N). Thus, signals sent to and from infrastructure by end-users 112 via an end user device 114 may be routed directed, processed, and distributed in a variety of ways via the equipment and interconnections within infrastructure 102.

Example Monitoring System

Figure 2:
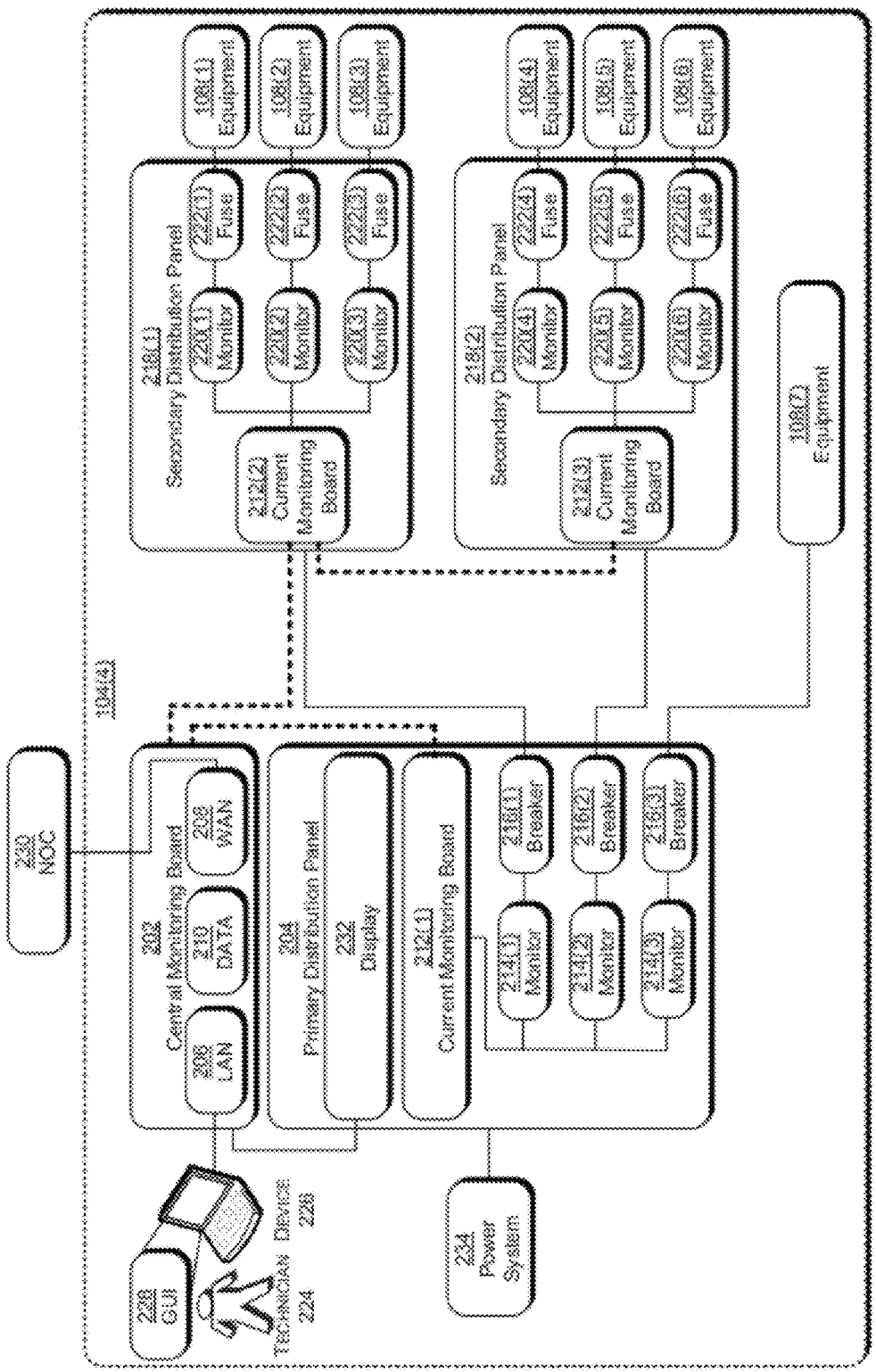
FIG. 2 illustrates an example implementation of a central office monitoring system for use in a central office site.

FIG. 2 illustrates an example implementation of a central office site 104(4) having a monitoring system for use in telecommunication network infrastructure 102. The monitoring system arranged in the central office site 104(4) may track power consumption in the central office site 104(4). The monitoring system may comprise a central monitoring board 202 configured to receive and send a reported current value. FIG. 2 illustrates the central monitoring board 202 coupled to a primary power distribution system 204 arranged in the central office site 104(4). While FIG. 2 illustrates the central monitoring board 202 being coupled to the primary power distribution system 204, the central monitoring board 202 may be housed in a 1RU shelf, in a separate enclosure, or housed (i.e., disposed) in the primary power distribution system 204. FIG. 2 illustrates the central monitoring board 202 comprising a LAN port 206, a WAN port 208, and an onboard data storage 210. The primary power distribution system 204 may be a Battery Distribution Feeder Bay (BDFB) in some instances. The primary power distribution system 204 may have input capacities of 800 amps and outputs circuits up to 125 amps in some instances.

In some instances, the central monitoring board 202 may be configured to communicate with a video camera, a weather station, a mobile device (e.g., a smart phone), or the like. For example, a central monitoring board may communicate with a video camera that is capable of recording, among other things, a maintenance service performed on a piece of telecommunications equipment by a human operator. Further, the central monitoring board 202 may comprise an open wireless technology (e.g., Bluetooth™) for exchanging data with a mobile device (e.g., handheld device, handheld computer, smartphone, mobile phone, personal digital assistant (PDA), or the like).

FIG. 2 illustrates a current monitoring board 212(1) disposed in the primary power distribution system 204 and communicatively coupled with the central monitoring board 202. FIG. 2 further illustrates the primary distribution system 204 comprising current monitor(s) 214(1), 214(2), and 214(3) being arranged directly in-line with circuit breaker(s) 216(1), 216(2), and 216(3), respectively. While FIG. 2 illustrates current monitor(s) being arranged directly in-line with circuit breaker(s), the current monitor(s) may be arranged directly in-line with any other type of power protection device suitable for protecting equipment arranged in-line with the current monitor(s). The circuit breaker current monitor(s) 214(1), 214(2), and 214(3) may be electrically "daisy chained" with each other. The circuit breaker current monitor(s) 214(1), 214(2), and 214(3) being configured to monitor a current flowing through the circuit breaker(s) 216(1), 216(2), and 216(3), respectively. The circuit breaker current monitor(s) 214(1), 214(2), and 214(3) are configured to report the monitored circuit breaker current to the primary power distribution current monitoring board 212(1). Circuit breaker current monitor(s) 214(1), 214(2), and 214(3) may be, for example, Hall effect current monitors, although any other efficient (and potentially low cost) current sensors may be implemented. The Hall effect current monitors may be purchased from a supplier. For example, the Hall effect current monitors may be purchased from the following suppliers: Melexis Microelectronic Systems, located at Rozendaalstraat 12, B-8900 leper, Belgium; Allegro MicroSystems, Inc., located at 115 Northeast Cutoff, Worcester, Mass. 01606 USA; Analog Devices Inc. located at 3 Technology Way Norwood, Mass. 02062; or Honeywell International Inc., located at 101 Columbia Road Morristown, N.J. 07962.

While FIG. 2 illustrates a current monitoring board receiving reported currents, the current monitoring board may monitor and/or measure other indicators. For example, a current monitoring board may measure a local temperature, a circuit voltage, the presence of absence of any sort of leak (e.g., water, etc.), or the like. Further, a current monitoring board may comprise one or more digital inputs and/or outputs, one or more analog inputs and/or outputs, and be communicatively coupled with power sensors.

Subsequent to the reporting, the primary power distribution current monitoring board 212(1) reports the monitored circuit breaker currents to the central monitoring board 202. While FIG. 2 illustrates three current monitors and three respective circuit breakers disposed in the primary power distribution system 204, any number of current monitors and respective circuit breakers are contemplated. Further, FIG. 2 illustrates a current monitoring board 212(2) disposed in a secondary power distribution system 218(1) and communicatively coupled with the central monitoring board 202. In addition, FIG. 2 illustrates another current monitoring board 212(3) disposed in another secondary power distribution system 218(2), which is also communicatively coupled with the central monitoring board 202. More specifically, the current monitoring board(s) 212(1), 212(2), and 212(3) may be communicatively coupled with the central monitoring board 202 via an RS-485 communications standard.

While FIG. 2 may illustrate the current monitoring boards communicatively coupled with a central monitoring board via an RS-485 communications standard, other suitable communication types are contemplated. For example, the current monitoring boards may be communicatively coupled with a central monitoring board via a discrete digital line, a discrete analog line, an RS-232 communications standard, an internet protocol (IP), or the like. While FIG. 2 illustrates the current monitoring board(s) 212(1), 212(2), and 212(3), as being the same or similar, the current monitoring board 212(1) may be distinct or different from current monitoring boards 212(2) and 212(3). For example, current monitoring board 212(1) may be uniquely configured to receive the monitored circuit breaker currents, as opposed to current monitoring boards 212(2) and 212(3) configured to receive the monitored fuse currents.

Secondary power distribution system 218(1) and 218(2) may be located in cabinets 106. Each secondary power distribution system 218(1) and 218(2) may bring 100 amps and deliver up to 20 amp circuits in some instances. The secondary power distribution system 218(1) is illustrated as comprising current monitor(s) 220(1), 220(2), and 220(3) being arranged directly in-line with fuse(s) 222(1), 222(2), and 222(3), respectively. While FIG. 2 illustrates current monitor(s) being arranged directly in-line with fuse(s), the current monitor(s) may be arranged directly in-line with any other type of power protection device suitable for protecting equipment arranged in-line with the current monitor(s). The fuse current monitor(s) 220(1), 220(2), and 220(3) may be electrically daisy chained with each other. The fuse current monitor(s) 220(1), 220(2), and 220(3) being configured to monitor a current flowing through the fuse(s) 222(1), 222(2), and 222(3), respectively. The fuse current monitor(s) 220(1), 220(2), and 220(3) may be configured to report the monitored fuse current to the secondary power distribution current monitoring board 212(2).

Subsequent to the reporting, the secondary power distribution current monitoring board 212(2) reports the monitored fuse currents to the central monitoring board 202. While FIG.

2 illustrates three current monitors and three respective fuses disposed in the secondary power distribution system 218(1), any number of current monitors and respective fuses are contemplated. Further, while the secondary power distribution system 218(1) may illustrate distributing power to each piece of telecommunications equipment 108(1), 108(2), and 108(3), the secondary power distribution system 218(1) may distribute power to any number of pieces of telecommunications equipment.

Similarly, while FIG. 2 illustrates three current monitors and three respective fuses disposed in the secondary power distribution system 218(2), any number of monitors and respective fuses are contemplated. Further, while the secondary power distribution system 218(2) may be illustrated as distributing power to each piece of telecommunications equipment 108(4), 108(5), and 108(6), the secondary power distribution system 218(2) may also distribute power to any number of pieces of telecommunications equipment.

FIG. 2 also illustrates telecommunication equipment 108(7) arranged directly in-line with the breaker 216(3) disposed in the primary power distribution system 204. While FIG. 2 illustrates one piece of telecommunication equipment arranged directly in-line with a breaker, any number of telecommunication equipment may be arranged directly in-line with any number of respective breakers. Here, with respect to the central office site 104(4), each piece of telecommunication equipment 108(1), 108(2), 108(3), 108(4), 108(5), 108(6), and 108(7), may be considered a circuit. In addition, each piece of telecommunication equipment 108(1), 108(2), 108(3), 108(4), 108(5), 108(6), and 108(7), may be considered a load. Further, each piece of telecommunication equipment 108(1), 108(2), 108(3), 108(4), 108(5), 108(6), and 108(7), may be identified with a respective monitor. For example, each piece of telecommunication equipment 108(1), 108(2), 108(3), 108(4), 108(5), and 108(6), may be identified with fuse current monitors 220(1), 220(2), 220(3), 220(4), 220(5), and 220(6), respectively. Similarly, telecommunications equipment 108(7) may be identified with circuit breaker current monitor 214(3). In addition, each secondary power distribution system 218(1) and 218(2) may be identified with circuit breaker current monitors 214(1) and 214(2), respectively. While FIG. 2 may illustrate telecommunication equipment as components 108, telecommunication equipment may be network elements 110, or any other suitable telecommunication equipment utilized by telecommunication network infrastructure 102.

The central monitoring board 202 may comprise an approved standard telecommunication equipment list stored in memory and configured specifically for the central office site 104(4). The approved standard telecommunication equipment list may be used to define what is attached to each circuit breaker or fuse position. The WAN port 208 may be configured to communicatively couple with a NOC 230, and a technician 224 may communicatively couple a device 226 with the central monitoring board 202 via the LAN port 206. Here, the technician 224 may interface with a GUI 228 to configure settings on the central monitoring board 202. Further, the technician 224 may also utilize the approved standard telecommunication equipment list to define what is attached to each circuit breaker or fuse position. For example, a technician may interface with the GUI 228 to select each telecommunication equipment 108 and/or secondary power distribution systems 218(1) and 218(2) from the approved standard telecommunication equipment list unique to the central office site 104(4). Because each telecommunication equipment 108(1), 108(2), 108(3), 108(4), 108(5), 108(6), and 108(7), and/or secondary power distribution systems 218(1) and 218(2), may be identified with respective monitors 220(1), 220(2), 220(3), 220(4), 220(5), 220(6), and/or 214(1) and 214(2), the central monitoring board 202 may identify each of the reported currents with the identified telecommunication equipment and/or secondary power distribution systems. For example, the central monitoring board 202 may identify a reported circuit breaker current with the identified telecommunication equipment 108(7) arranged in-line with the circuit breaker 216(3).

Further, the central monitoring board 202 may identify a reported fuse current with the identified telecommunication equipment 108(1) arranged in-line with the fuse 222(1). In addition, the central monitoring board 202 may associate a reported circuit breaker current with the identified secondary power distribution system 218(1) arranged in-line with the breaker 216(1). The central monitoring board 202 may also be configured to work as a simple network management protocol (SNMP) client over the WAN port 208, which would provide for seamless integration with existing management systems in the NOC 230. In addition or in the alternative, the central monitoring board 202 may also comprise a web server on the WAN port 208, which would provide for configuration of settings on the central monitoring board 202 from any network attached device.

The central monitoring board 202 onboard data storage 210 may log data, which may be provided for review of data after a failure of telecommunication equipment or breaker/fuse trip. A display 232 (e.g., a liquid crystal display (LCD) or any other type of display) may also be included in the monitoring system. The display 232 may be disposed in the primary power distribution system 204, or the display may be a standalone unit. The LCD may be communicatively coupled with the central monitoring board 202 and configured for displaying real time data, displaying configuration of attached loads, or displaying historical data.

FIG. 2 also illustrates a power system 234 arranged in the central office site 104(4). The power system 234 may receive power from a power utility and may be configured to deliver DC power to the primary power distribution system 204. As discussed above in more detail, the primary power distribution system 204 may be configured to deliver power to secondary power system(s) 218(1) and/or 218(2), and the secondary power distribution system(s) 218(1) and 218(2) may be configured to deliver power to telecommunication equipment.

Example Process of Monitoring a Central Office Site

Figure 3:
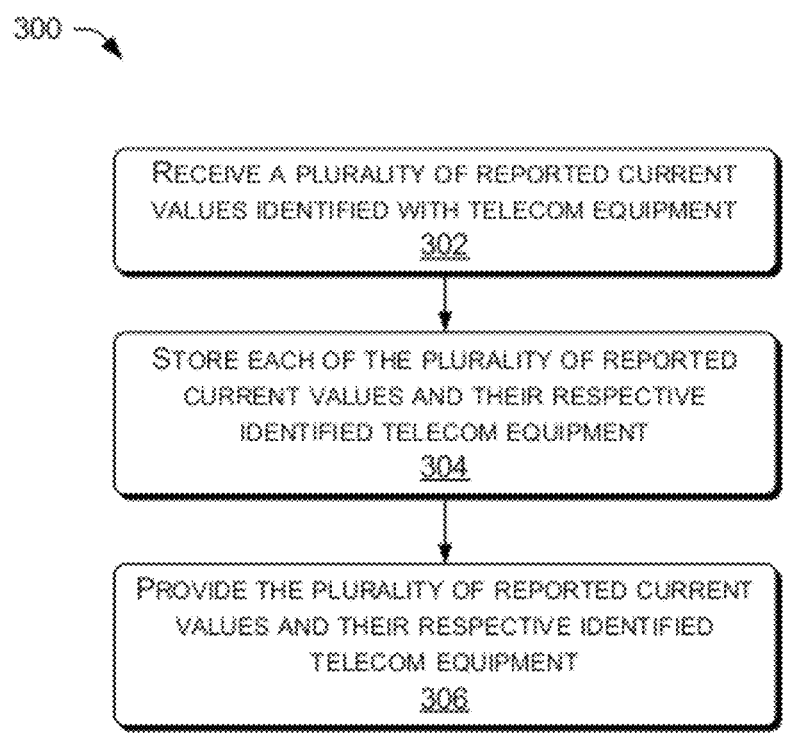
FIG. 3 is a flow diagram that illustrates an example process of monitoring a central office site.

FIG. 3 is a flow diagram that illustrates an example process 300 of monitoring a central office site, such as the central office site 104(4) illustrated in FIG. 2. While this figure illustrates an example order, it is to be appreciated that the described operations in this and all other processes described herein may be performed in other orders and/or in parallel in some instances. In the illustrated example, this process begins at operation 302, where a central monitoring board (e.g., central monitoring board 202) disposed at a central office site may receive a plurality of reported current values (e.g., reported circuit breaker current values and/or reported fuse current values). Each of the plurality of reported current values may be identified with a respective piece of telecommunication equipment (e.g., telecommunication equipment 108(1), 108(2), 108(3), 108(4), 108(5), 108(6), and 108(7)). Further, some or all of the plurality of reported current values may be identified with a respective power distribution system (e.g., secondary power distribution system 218(1) and/or 218(2)). For example, and as discussed above, a technician (e.g., technician 224) may utilize an approved standard telecommunication equipment list, stored in memory of the central monitoring board, to define what is attached to each circuit breaker or fuse position. While operation 302 describes a central monitoring board receiving a plurality of reported current values identified with a respective piece of telecommunication equipment arranged in the central office site, operation 302 may include the central monitoring board receiving a plurality of serial numbers identified with respective telecommunication equipment and/or a plurality of current alarm states identified with respective telecommunication equipment.

Process 300 also includes operation 304, which represents the central monitoring board storing each of the plurality of reported current values and their respective telecommunication equipment arranged in the central office site. For example, the central monitoring board may store each of the plurality of reported current values and their respective telecommunication equipment in the central monitoring board's onboard data storage (e.g., onboard data storage 210). While operation 304 describes a central monitoring board storing each of the plurality of reported current values and their respective telecommunication equipment arranged in the central office site, operation 304 may include the central monitoring board storing a plurality of serial numbers identified with respective telecommunication equipment and/or a plurality of current alarm states also identified with the respective telecommunication equipment.

Process 300 may be completed at operation 306 in some instances, which represents the central monitoring board providing the plurality of reported current values and their respective telecommunication equipment arranged in the central office site. For example, the central monitoring board may provide the plurality of reported current values and their respective telecommunication equipment arranged in the central office site to a display (e.g., display 230). While operation 306 describes providing the plurality of reported current values and their respective telecommunication equipment arranged in the central office site to a display, operation 306 may include the central monitoring board providing the plurality of reported current values and their respective telecommunication equipment arranged in the central office site to a central server and/or to another device (e.g., device 226). Further, while operation 306 describes providing plurality of reported current values and their respective telecommunication equipment arranged in the central office site, operation 306 may include providing the plurality of serial numbers identified with respective telecommunication equipment and/or a plurality of current alarm states also identified with the respective telecommunication equipment.

Example Control System

Figure 4:
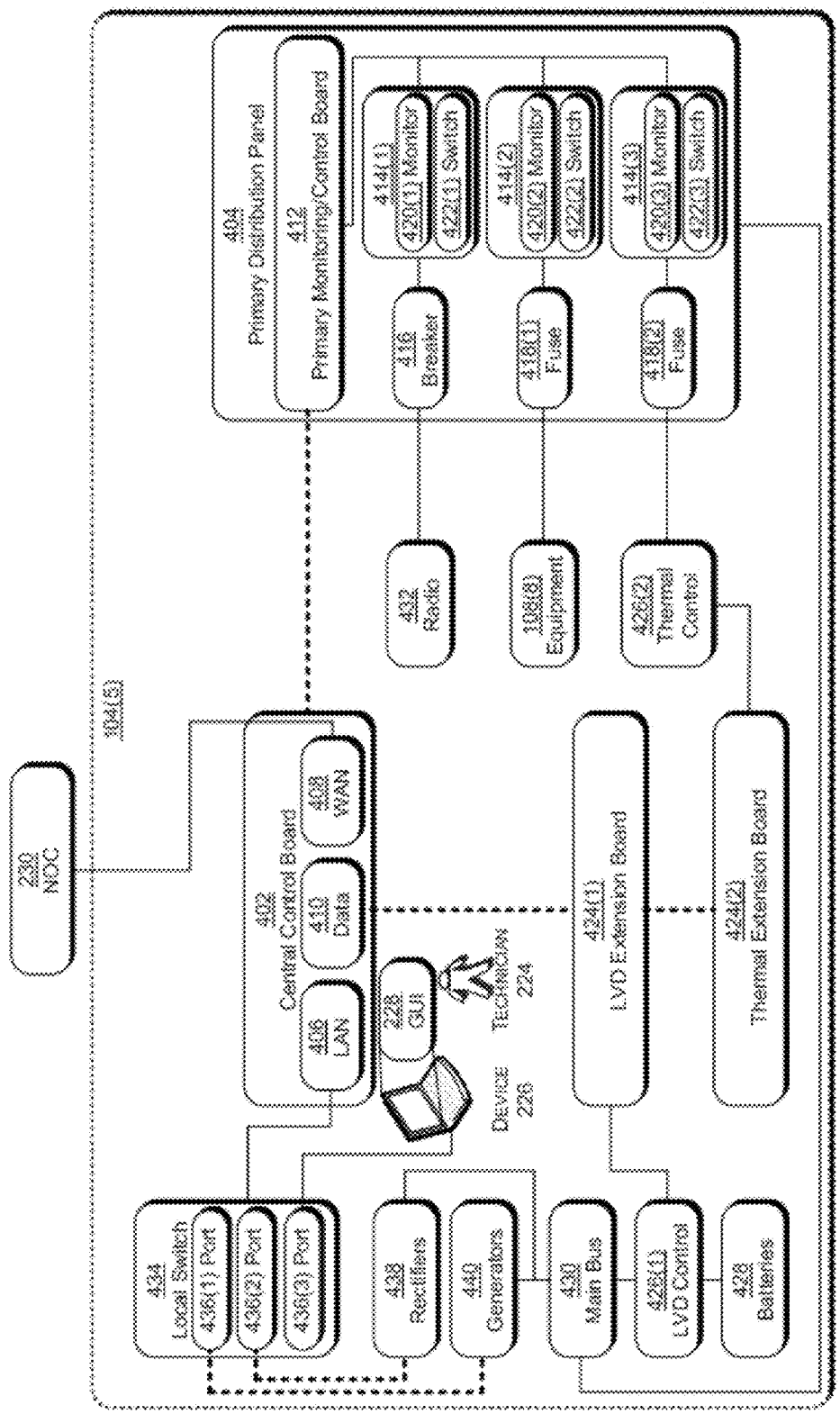
FIG. 4 illustrates an example implementation of a central control system for use in a wireless site.

FIG. 4 illustrates an example implementation of a wireless site 104(5) having a central control system for use in telecommunication network infrastructure 102. The control system arranged in the wireless site 104(5) may take in inputs from a plurality of components 108 or network elements 110 at the wireless site 104(5). For example, a central control board 402 may take in inputs from thermalelectric coolers, heat exchangers, generators, solar panels, wind turbines, rectifiers, radio inputs, battery systems, breaker panels, fuse panels or GMT panels. The central control board 402 may take in inputs over discrete digital lines, over discrete analog lines, over an RS232 communication standard, over an RS485 communication standard, or over an IP based communication. The central control board 402 may receive, from each component 108 or network elements 110 at the wireless site 104(5), alarms when parameters are outside optimal bounds. The central control board 402 may also receive status information (e.g., current draw, voltage level, switch state, wind speed, or the like) from the components 108 and/or the network elements 110.

The central control board 402 may be configured to receive control signals. The central control board 402 may be similar to, and comprise many of the same features as the central monitoring board 202. FIG. 4 illustrates the central control board 402 coupled to a primary power distribution system 404 arranged in the wireless site 104(5). While FIG. 4 illustrates the central control board 402 being arranged with the primary power distribution system 404, the central control board 402 may be housed in a 1RU shelf, in a separate enclosure, or housed (i.e., disposed) in the primary power distribution system 404.

FIG. 4 illustrates the central control board comprising a LAN port 406, a WAN port 408, and an onboard data storage 410. The primary power distribution system 404 is typically a Battery Distribution Frame Bay (BDFB). FIG. 4 illustrates a primary board 412 disposed in the primary power distribution system 404 and communicatively coupled with the central control board 402. FIG. 4 further illustrates the primary distribution system 404 comprising current monitor and control board(s) 414(1), 414(2), and 414(3) being arranged directly in-line with circuit breaker 416, fuse(s) 418(1), and 418(2), respectively. While FIG. 4 illustrates current monitor and control board(s) being arranged directly in-line with circuit breaker(s) and fuse(s), the current monitor and control board(s) may be arranged directly in-line with any other type of power protection device suitable for protecting equipment arranged in-line with the current monitor and control board(s). The current monitor and control board(s) 414(1), 414(2), and 414(3) may be electrically daisy chained with each other. While FIG. 4 illustrates the current monitor and control boards 414(1), 414(2), and 414(3), as being the same or similar, the current monitor and control board 414(1) may be distinct or different from current monitor and control boards 414(2) and 414(3). For example, current monitor and control board 414(1) may be uniquely configured to receive the monitored circuit breaker current, as opposed to current monitor and control boards 414(2), and 414(3) configured to receive the monitored fuse currents. Each of the current monitor and control board(s) 414(1), 414(2), and 414(3) may comprise a current monitor 420(1), 420(2), and 420(3) arranged along with a switch 422(1), 422(2), and 422(3), respectively. The current monitor(s) 420(1), 420(2), and 420(3) may be similar to, and comprise many of the same features as the monitors 214(1), 220(1), and 220(2), respectively. Each of the current monitor(s) 420(1), 420(2), and 420(3), may be configured to monitor a current flowing through the circuit breaker 416, and fuse(s) 418(1), and 418(2), respectively. Each of the current monitor(s) 420(1), 420(2), and 420(3), may also be configured to report the monitored circuit breaker current and or fuse current to the primary board 412.

Circuit breaker current monitor 420(1) may comprise, for example, a Hall effect current monitor. Similarly, each of fuse current monitors 420(2) and 420(3) may also comprise, for example, a Hall effect current monitor. However, any other efficient and low cost current sensor may be implemented by the current monitors. Subsequent to the reporting, the primary board 412 may in turn report the monitored circuit breaker and fuse currents to the central control board 402. Each of the switch(s) 422(1), 422(2), and 422(3) may be configured to turn on and/or off based on a control signal received from the central control board 402. For example, switch 422(1) may be configured to turn on and/or off, and switch 422(2) may be configured to turn on and/or off based on a control signal received from the central control board 402. While FIG. 4 illustrates three current monitor and control boards arranged directly in-line with a circuit breaker and fuses, respectively, any number of current monitor and control boards are contemplated. Similarly, while FIG. 4 illustrates a single circuit breaker and two fuses disposed in the primary power distribution system 404, any number of circuit breakers and fuses are contemplated.

FIG. 4 illustrates an extension board(s) 424(1) and 424(2) that may be arranged in the wireless site 104(5). FIG. 4 illustrates the extension board(s) 424(1) and 424(2) each electrically coupled with a controller 426(1) and 426(2), respectively. FIG. 4 further illustrates the extension board(s) 424(1) and 424(2) may be communicatively coupled with the central control board 402. The extension board(s) 424(1) and 424(2) may each be configured to control the controller(s) 426(1) and 426(2), respectively, based on a control signal received from the central control board 402. The extension board(s) 424(1) and 424(2) may each be communicatively coupled with the central control board 402 via an RS-485 communications standard. In addition, the primary board 412 may be communicatively coupled with the central control board 402 via an RS-485 communications standard. While FIG. 4 illustrates two extension boards and two respective controllers arranged in the wireless system 104(5), any number of extension boards and respective controllers are contemplated.

Further, while FIG. 4 may illustrate the controller 426(1) as a LVD control, the controller 426(1) may be any type of controller suitable for controlling telecommunication equipment (e.g., components 108 or network elements 110). Here, the LVD controller 426(1) may be configured to connect and/or disconnect batteries 428 from a main bus 430 based on a control signal received from the central control board 402. Similarly, while FIG. 4 may illustrate the controller 426(2) as a thermal control, the controller 426(2) may be any type of controller suitable for controlling telecommunication equipment (e.g., components 108 or network elements 110). Here, the thermal controller 426(2) may be configured to control a temperature of the wireless site system 104(5) based on a control signal received from the central control board 402.

FIG. 4 illustrates the primary power distribution system 404 may comprise a radio arranged directly in-line with the circuit breaker 416, a telecommunication equipment 108(8) arranged directly in-line with the fuse 418(1), and the thermal control 426(2) arranged directly in-line with the fuse 418(2). While the primary power distribution system 404 may be illustrated as distributing power to a radio 432, a telecommunication equipment 108(8), and the thermal controller 426(2), the primary power distribution system 404 may also distribute power to any number of radios, telecommunication equipments, thermal controls, or the like, used by the wireless site 104(5). While FIG. 4 may illustrate telecommunication equipment as component 108, telecommunication equipment may be network elements 110, or any other suitable telecommunication equipment utilized by telecommunication network infrastructure 102.

Here, the radio 432, the telecommunication equipment 108(8), and thermal control 426(2) may each be considered a circuit, respectively. Further, the radio 432, the telecommunication equipment 108(8), and thermal control 426(2), may each be considered a load. Further, the radio 432, the telecommunications equipment 108(8), and thermal control 426(2) may be identified with a respective current monitor and control board. For example, the radio 432 may be identified with current monitor and control board 414(1), the telecommunication equipment 108(8) may be identified with current monitor and control board 414(2), and the thermal control may be identified with current monitor and control board 414(3).

Similar to the central monitoring board 202, discussed above with respect to FIG. 2, the central control board 402 may comprise an approved standard telecommunication equipment list stored in memory. Here however, the approved standard telecommunication equipment list may be configured specifically for the wireless site 104(5). The approved standard telecommunication equipment list may be used to define what is attached to each circuit breaker or fuse position, while the configuration of the wireless site 104(5) may be handled in the background without input from a technician 224.

As discussed above, and similar to the central monitor board 202, the central control board 402 may comprise a LAN port 406, a WAN port 408, and onboard board data storage 410. The WAN port 408 may be configured to communicatively couple with a NOC 230, and a technician 224 may communicatively couple a device 226 (i.e., a local user device) with the central control board 402 via the LAN port 206. The WAN port 408 may be configured to receive a control signal and to send data. For example, the WAN port 408 may receive a control signal from the NOC 230 and data may be sent to the NOC 230 from the WAN port 408. The technician 224 may interface with a GUI 228 to configure settings on the central control board 402.

Further, the technician 224 may also utilize the approved standard telecommunication equipment list to define what is attached to each circuit breaker or fuse position. For example, a technician may interface with the GUI 228 to select each radio (e.g., radio 432), each piece of telecommunication equipment (e.g., telecommunication equipment 108(8), thermal control (e.g., thermal control 426(2)), or any other component 108 from the approved standard telecommunication equipment list unique to the wireless site 104(5). Because each radio (e.g., radio 432), piece of telecommunication equipment (e.g., telecommunication equipment 108(8), thermal control (e.g., thermal control 426(2)), or any other component 108, may be identified with respective current monitor and control boards 414(1), 414(2), and 414(3), the central control board 402 may identify each of the reported currents with the identified radio, telecommunication equipment, thermal control, or any other component 108. For example, the central control board 402 may identify a reported circuit breaker current with the identified radio 432 arranged directly in-line with the circuit breaker 416.

Further, the central control board 402 may identify a reported fuse current with the identified telecommunication equipment 108(8) arranged directly in-line with the fuse 418(1). In addition, the central control board 402 may associate a reported fuse current with the identified thermal control 426(2) arranged in-line with the fuse 418(2). As discussed above, the central control board 402 may comprise a LAN port 406. The central control board 402 may comprise a plurality of protocols available for communication over the LAN port. The LAN port 406 may be an internal LAN port configured to connect to a single device (e.g., device 226) or could be connected to a network switch to allow multiple devices to be connected.

For example, a weather station may be IP-based and connected over IP with a local switch (e.g., port 436(1)). The central control board 402 may also be configured to work as an SNMP aggregator. For example, the central control board 402 may act as an SNMP client over the WAN port 208, which would provide for seamless integration with existing management systems in the NOC 230. The central control board 402 may be configured to act as an SNMP server and collect all SNMP information available from the SNMP enabled devices attached (e.g., communicatively coupled) to the LAN network.

In addition, the central control board 402 may also comprise a web server on the WAN port 408 (there could also be a web server on LAN port 406 to allow device 226 to access configuration settings), which would provide for configuration of settings on the central control board 402 from any network attached device. The central control board 402 may comprise a connection over a modem (e.g., a plain old telephone service (POTS) line or a global system for global communications (GSM) modem). Because the control system may incorporate the routing functionality, the wireless site 104(5) may only comprise one WAN port 208. For example, the NOC may log in and interface with the central control board 402 to determine the components 108 connected to the central control board 402 at the wireless site 104(5). The onboard data storage 210 of the central control board 402 may log data, which may provide for remote downloading of data and subsequently used to analyze the wireless site 104(5) performance.

Further, the central control board 402 may be configured to handle the network address translation (NAT) to provide for the NOC to access items attached to the LAN port interface directly or through the local switch. The central control board 402 may be configured to provide a trusted interface between an operations group utilizing the WAN port and a network group utilizing the LAN port. For Example, the NOC may be able to log in and with the proper permissions interface with the IP weather station or an attached generator. For example, the central control board 402 may require all or substantially all communication traffic to take place on the LAN port side, where a firewall may separate the WAN port communications from the LAN port communications. The central control board may comprise a processor arranged with the WAN port side and another processor arranged with the LAN port side. As such, the central control board firewall and two processors may provide for clean and trusted communications between the WAN port side and the LAN port side.

FIG. 4 illustrates that a local switch 434 may be arranged in the wireless site 104(5). The local switch 434 may be communicatively coupled with the LAN port 406. FIG. 4 illustrates the local switch may comprise port(s) 436(1), 436(2), and 436(3). Each of the port(s) 436(1), 436(2), and 436(3) may be communicatively coupled with a power device (e.g., a rectifier 438 or a generator 440) and/or a local user device 226, respectively. Any one of the port(s) 436(1), 436(2), and 436(3) may be configured to provide trusted access to a power device(s) communicatively coupled with the local switch 434, and trusted access to any components 108 connected to the central control board 402 at the wireless site 104(5). For example, FIG. 4 illustrates port 436(3) may be configured to provide trusted access to the rectifiers 438 and generators 440, as well as to radio 432, telecommunication equipment 108(8), and thermal control 426(2). Each of the port(s) 436 (1), 436(2), and 436(3) may be configured to control a power device based on a control signal received from the central control board 402. For example, port 436(1) may be communicatively coupled with the generators 440, via an Ethernet connection, and may turn on and/or off the generators 440 based on a control signal received from the central control board 402. Further, port 436(2) may be communicatively coupled, via an Ethernet connection, with the rectifiers 438 and may set the rectifiers 438 to deliver a particular DC power based on a control signal received from the central control board 402.

Example Extension Board

Figure 5:
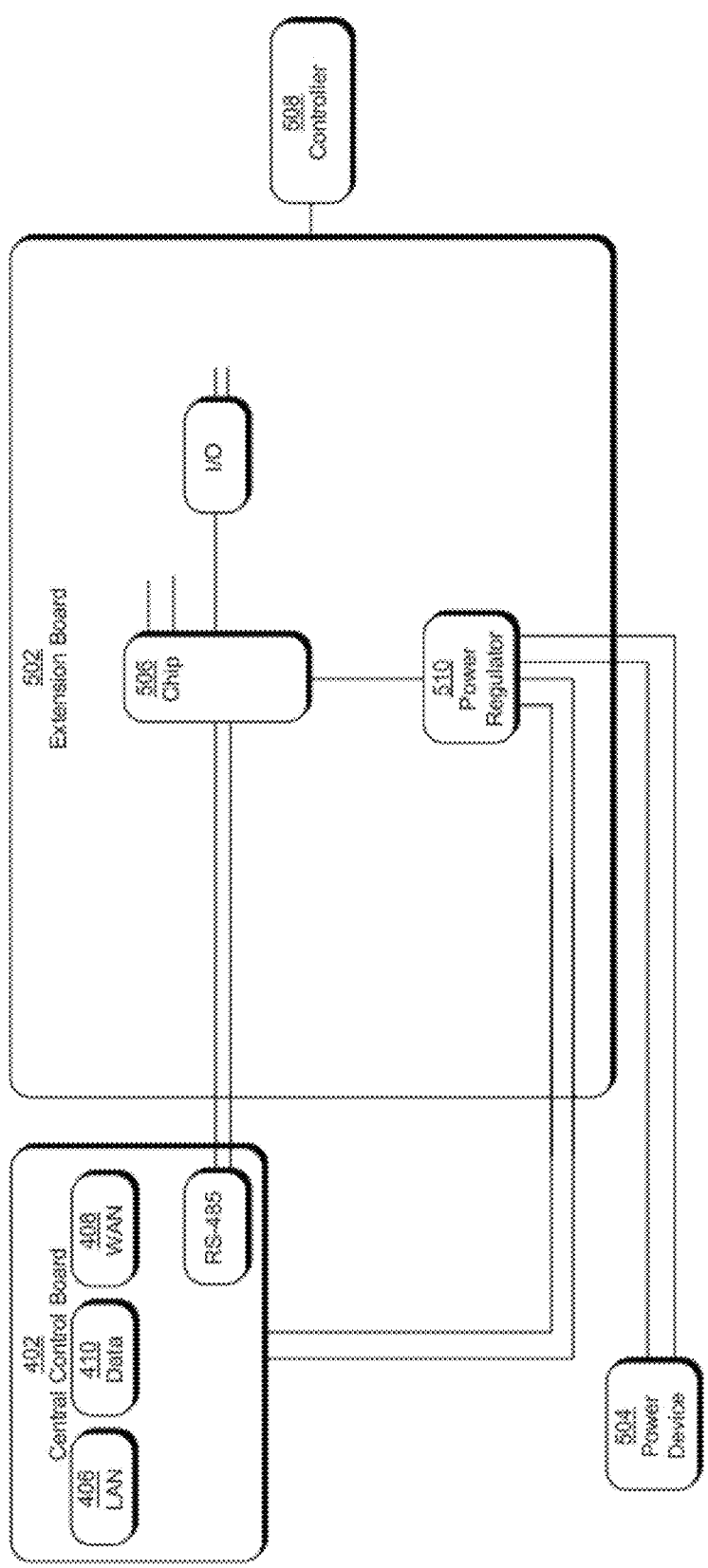
FIG. 5 illustrates an example implementation of an extension board.

FIG. 5 illustrates an example extension board 502, which may be an implementation of the extension board(s) 424(1) and 424(2) illustrated in FIG. 4. As discussed above, extension board 502 may be communicatively coupled with the central control board 402. For example, extension board 502 may be communicatively coupled with the central control board 402 via an RS-485 communications standard.

Extension board 502 may be configured to receive power from the central control board 402 or a power device(s) 504. For example, extension board 502 may be configured to receive filtered or un-filtered power from a battery (e.g., batteries 428), a rectifier (e.g., rectifier 438), a generator (e.g., generator 440) or any other type of device that is capable of providing power. FIG. 5 illustrates the extension board 502 may comprise a chip 506. The chip 506 may be configured to report its function based on a controller 508 it is electrically coupled with. In addition, the chip 506 may be configured to report its function to the central control board 402. For example, the controller 508 may be a LVD controller (e.g., LVD control 426(1)) configured to connect and/or disconnect a battery (e.g., battery 428) from a main bus (e.g., main bus 430), and the extension board chip 506 may report its function as a LVD controller to the central control board 402. Further, the controller 508 may be a thermal controller (e.g., thermal control 426(2)) configured to control a temperature of the wireless site 104(5), and the extension board chip 506 may report its function as a thermal controller to the central control board 402. FIG. 5 illustrates the extension board 502 may comprise a power regulator 510 to provide reliable voltage received from a local power source (e.g., a central control board 402 or a power device 504).

Example Process of Controlling a Wireless Site

Figure 6:
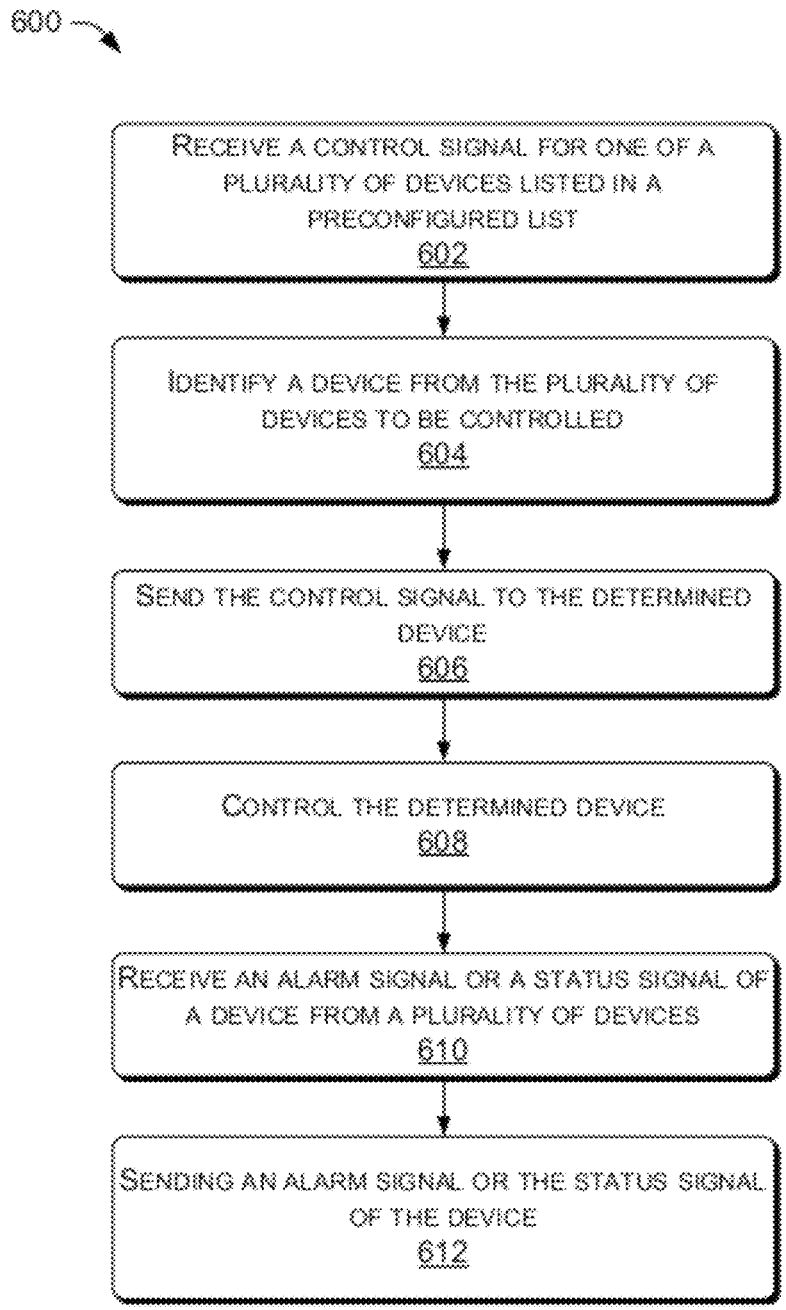
FIG. 6 is a flow diagram that illustrates an example process of controlling a wireless site.

FIG. 6 is a flow diagram that illustrates an example process 600 of controlling a wireless site, such as the wireless site 104(5) illustrated in FIG. 4. In some instances, this process begins at operation 602, where a central control board (e.g., central control board 402) disposed at a wireless site may receive a control signal for one of a plurality of devices 108 disposed at the wireless site 104(5). For example, the central control board disposed at the wireless site may receive a control signal for one of a radio (e.g., radio 432), a piece of telecommunication equipment (e.g., telecommunication equipment 108(8), a thermal control (e.g., thermal control 426(2)), a LVD control (e.g., LVD control 426(1)), a rectifier (e.g., rectifier 438), a generator (e.g., generator 442), or the like. As discussed above, the central control board may be communicatively coupled with the plurality of devices 108 via an RS-485 communications standard or the like. While process 600 comprises a central control board receiving a control signal from a NOC (e.g., NOC 230), the central control board may comprise onboard logic to control any of the plurality of device disposed at the wireless site. For example, a central control board may comprise onboard logic to take action in the absence of an override communication with the NOC.

Process 600 also includes operation 604, which represents the central control board determining a device from the plurality of devices to be controlled based at least in part on the received control signal. In some instances, the central control board maintains a list of devices to which the central control board couples. This list may be configured by an operator of the central control board, and technicians may add devices to the list in response to connecting the devices to the central control above. In one example, for instance, the central control board may determine that the device to be controlled comprises a rectifier or a generator disposed at the wireless site. Further, the central control board may determine that the device to be controlled comprises a radio, a piece of telecommunication equipment, or a thermal control arranged with a BDFB (e.g., BDFB 404). More specifically, the central control board may determine that the device to be as well as the determined device's identified circuit. For example, the central control board may determine that the piece of telecommunication equipment 108(8) is to be controlled and that it is identified with current monitor and control board 414(3).

Process 600 also includes operation 606, which represents the central control board sending the received control signal to the determined device disposed at the wireless site.

Next, at operation 608, the central control board controls the determined device disposed at the wireless site in response to the received control signal. For example, a NOC (e.g., NOC 230) may be monitoring a weather station disposed at the wireless site. The NOC may determine the weather is getting cloudy and may send a control signal to the thermal control comprising a signal to ramp down a cooling of the wireless site. The central control board may then control a thermal control based on the received control signal from the NOC. In addition, the NOC may be monitoring a voltage on a main bus (e.g., main bus 430) and may determine that the batteries (e.g., batteries 428) are getting too low and, hence, may be susceptible to becoming damaged. In response, the NOC may send a control signal to the central control board to trigger the LVD control to take the batteries off the main bus. The central control board may then control the LVD control based on the received control signal from the NOC.

Further, the NOC may be managing different types supply voltages (e.g., solar panel supply voltage, wind turbine supply voltage, utility supply voltage) on an AC side at the wireless site. As such, the NOC may send control signals to the central control board to control the rectifiers to load share between solar panels, wind turbines, and utility supply voltages. For example, the NOC may be monitoring a weather station disposed at the wireless site and may determine a lack of wind and send a control signal to the central control board to increase the rectifiers. The central control board may then control the rectifiers based on the received control signal from the NOC.

Operation 610 may follow operation 608, which may represent the central control board receiving an alarm signal or a status signal from one of the plurality of devices. For example, the central control board may receive an alarm signal from a main bus that a voltage parameter is outside an optimal bound. Further, the central control board may receive a status information signal received from a device disposed at the wireless site. For example, the central control board may receive a current draw, a voltage level, a switch state, a wind speed, or the like, from a device disposed at the wireless site.

Process 600 may be completed at operation 612, which represents the central control board sending an alarm signal or a status signal of a device from the plurality of devices disposed at the wireless site. For example, the central control board may send the received alarm signal from the main bus that a voltage parameter is outside an optimal bound. The central control board may send alarm signals or status signals of devices to an energy management server. As discussed in more detail below, an energy management server may be configured to integrate the received data from the central boards to allow a user (e.g., an auditor) to audit an energy usage of each piece of telecommunication equipment of each telecommunication site and/or audit a servicing or maintenance of each piece of telecommunication equipment of each telecommunication site. A user may then make more informed decisions regarding power and thermal management or maintenance of each telecommunication site.

Example Management System

Figure 7:
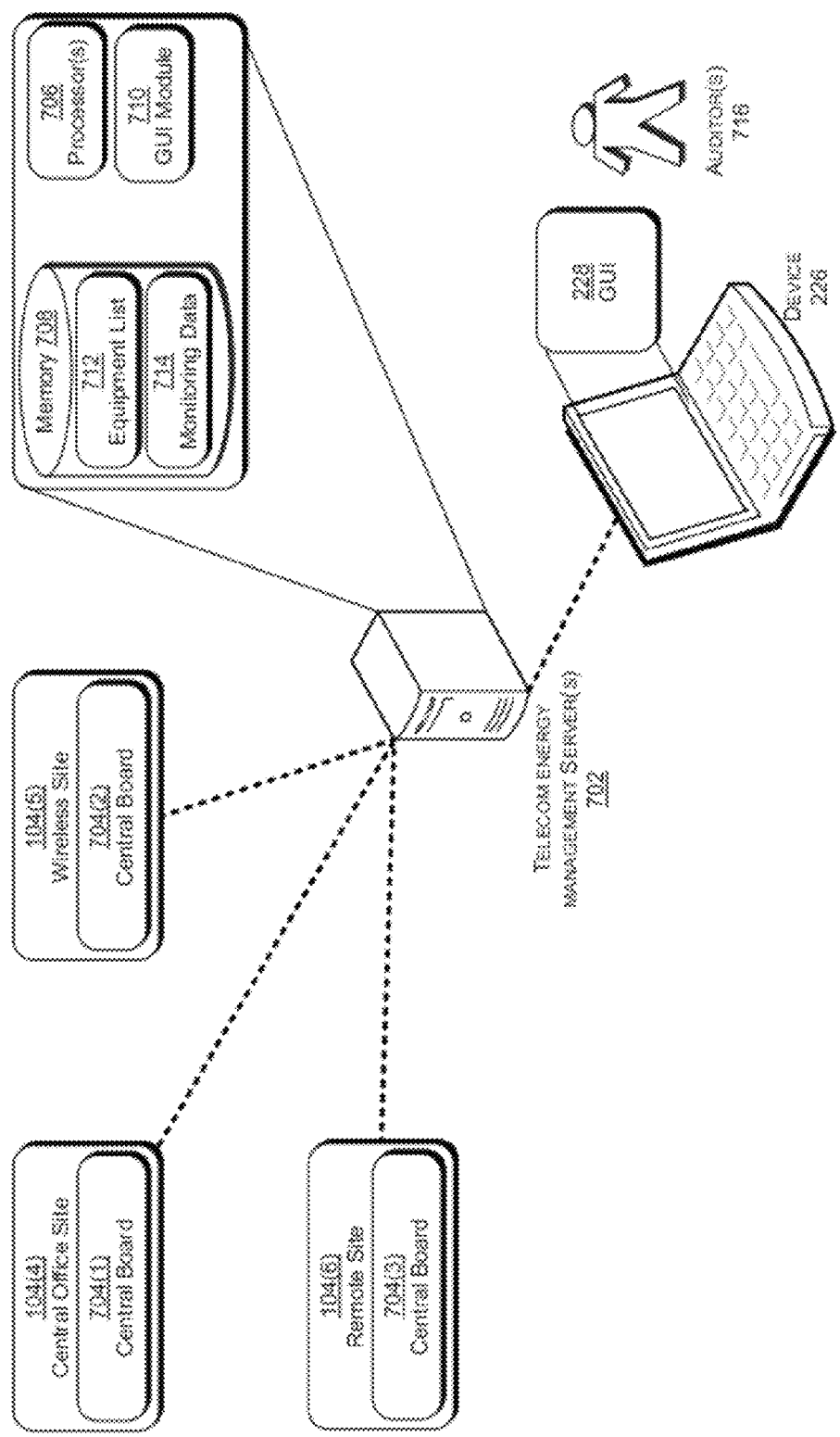
FIG. 7 illustrates an example implementation of a telecommunication network infrastructure communicatively coupled with a telecommunication energy management server, along with a user device displaying a telecommunication energy management GUI provided by the telecommunication energy management server.

FIG. 7 illustrates an example implementation of a telecommunication network infrastructure 102 having a telecommunication energy management server 702. The telecommunication energy management server 702 may be for managing an energy usage by the telecommunication network infrastructure 102 at varying levels of granularity. FIG. 7 illustrates the server 702 may be communicatively connected with a plurality of central board(s) 704(1), 704(2), and 704(3). Each of the central board(s) 704(1), 704(2), and 704(3) may be located at a respective telecommunication site(s) 104(4), 104(5), and 104(6). For example, server 702 may be communicatively connected with a central board 704(1) (e.g., a central monitoring board 202) located at a central office site 104(4), a central board 704(2) (e.g., a central control board 402) located at a wireless site 104(5), and a central board 704(3) located at a remote site 104(6), respectively. While FIG. 7 illustrates the server 702 being communicatively connected with three central boards, each located at a respective telecommunication site, the server 702 may be communicatively connected with any number of central boards located at respective telecommunication sites. FIG. 7 illustrates the server 702 may comprise a processor(s) 706, memory 708, and a GUI module 710. The memory 708 may be configured to store instructions executable on the processor(s) 706, and may comprise an approved standard telecommunication equipment list 712 and monitoring data 714. FIG. 7 further illustrates the server 702 communicatively connected with a user device 226 displaying a GUI 228 to an auditor(s) 716. The server 702 may also be configured to add in data from utility companies. For example, the server 702 may store in its memory 708 power pricing data made available by utility companies.

The memory 708 may store instructions that are executable on the processor(s) 706 and that are configured to provide the approved standard telecommunication equipment list 712 to each of the central board(s) 704(1), 704(2), and 704(3) located at telecommunication site(s) 104(4), 104(5), and 104 (6), respectively. Each of the approved standard telecommunication equipment list 712, provided by the server 702, may be specifically tailored for a telecommunication site(s) 104 (4), 104(5), and 104(6), respectively. For example, server 702 may provide a uniquely tailored approved standard telecommunication equipment list 712 to a central control board 402 located at wireless site 104(5). The provided approved standard telecommunication equipment list 712 may allow a selection of a telecommunication equipment to be installed in-line with a circuit breaker (e.g., circuit breaker(s) 216(1)- 216(3)) disposed in a primary power distribution system (e.g., primary power distribution system 204). Each of the telecommunication equipment listed in the approved standard telecommunication equipment list 712 may be associated with a respective specification for the specific type of telecommunication equipment. Further, the provided approved standard telecommunication equipment list 712 may allow a selection of a telecommunication equipment to be installed in-line with a fuse (e.g., fuse(s) 222(1)-222(6)) disposed in a secondary power distribution system (e.g., secondary power distribution system 218). For example, a technician may select telecommunication equipment from an approved standard telecommunication equipment list 712 that the technician installs, replaces, or upgrades at the telecommunication site. Further, the technician may subsequently save the selections as a preconfigured list in a memory of the central monitoring board disposed at the telecommunication site. The preconfigured list may comprise each of the particular devices installed at the telecommunication site and their respective circuits.

In addition, the memory 708 may store instructions executable on the processor(s) 706 to receive data from the central board(s) 704(1), 704(2), and 704(3) located at telecommunication site(s) 104(4), 104(5), and 104(6), respectively. The received data may comprise a plurality of reported current values, each reported current value being identified with a respective piece of telecommunication equipment (e.g., telecommunication equipment 108(1)-108(8)). Further, the server 702 memory 708 storing instructions executable on the processor(s) 706 may be configured to integrate the received data from the central board(s) 704(1), 704(2), and 704(3) located at telecommunication site(s) 104(4), 104(5), and 104(6), respectively. For example, the server 702 may integrate data from individual current monitors (e.g., monitors 214(1)-214(3), 220(1)-220(6), and/or 420(1)-420(3)). The memory 708 may also store instructions executable on the processor(s) 706 to provide a GUI (e.g., GUI 228). The GUI may be configured to allow a user (e.g., an auditor(s) 716) to audit an energy usage of each piece of telecommunication equipment of each telecommunication site. For example, the GUI may allow a user to audit energy usage of each piece of telecommunication equipment at a circuit level, compare energy usage of competing brands of particular pieces of telecommunication equipment, compare energy usage of a particular piece of telecommunication equipment across telecommunication sites, or compare energy usage of a particular piece of telecommunication equipment across geographic regions. The GUI may also allow a user to audit a servicing of telecommunication sites or audit maintenance of telecommunication sites. For example, the GUI may provide a status of a wireless site (e.g., wireless site 104(4)). The GUI may additionally or alternatively provide how long an enclosure door was open, or determine if a generator's fuel tank was completely filled, amongst other notifications.

Figure 8:
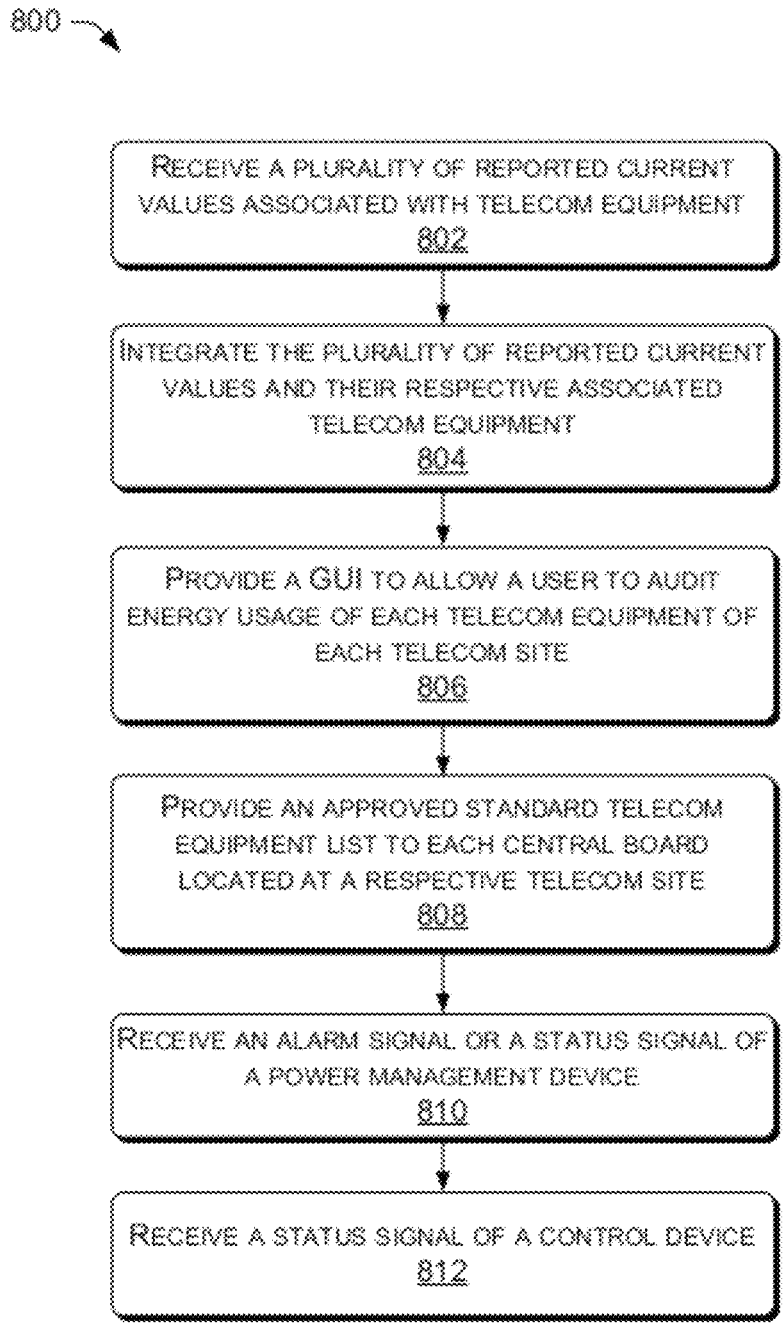
FIG. 8 is a flow diagram that illustrates an example process of managing energy usage in a telecommunication network infrastructure.

Example Process of Managing an Energy Usage by a Telecommunication Network Infrastructure FIG. 8 is a flow diagram that illustrates an example process 800 of managing an energy usage by a telecommunication network infrastructure 102 using the telecommunication energy management server 702 of FIG. 7. In some instances, this process begins at operation 802, where a server (e.g., server 702) may receive data from a plurality of central boards (e.g., central board(s) 704(1), 704(2), and 704(3)) located at respective telecommunication sites. For example, the server may receive data from a central monitoring board 202 located at a central office site 104(4), a central control board 402 located at a wireless site 104(5), or any other central board located at any other telecommunication site. As discussed above, the received data may comprise a plurality of reported current values, each reported current value being identified with a respective piece of telecommunication equipment. Further, the server may be communicatively connected with a WAN port (e.g., WAN port 208) disposed on each central board and receive the data via the WAN port connection. In addition, the server may receive the data from an onboard removable storage (e.g., onboard removable storage 210 or onboard removable storage 410) of each of the central boards. For example, each central board may comprise onboard removable storage storing the data comprising the plurality of reported current values, each reported current value being identified with a respective piece of telecommunication equipment. The onboard removable storage may be removed from each central board and subsequently uploaded to the server. This could be done according to a schedule or during a servicing of equipment.

Process 800 also includes, operation 804, which represents the server integrating the received data from the plurality of central boards located at the respective telecommunication sites. For example, the server may integrate the received data to allow a user (e.g., an auditor(s) 716) to audit energy usage of each telecommunication equipment at a circuit level, compare energy usage of competing brands of particular telecommunication equipment, compare energy usage of a particular piece of telecommunication equipment across telecommunication sites, or compare energy usage of a particular piece of telecommunication equipment across geographic regions.

Process 800 also includes operation 806, which represents the server providing a GUI (e.g., GUI 228) configured to allow a user to audit an energy usage of each piece of telecommunication equipment of each telecommunication site. For example, as discussed above, the GUI may allow a user to audit energy usage of each piece of telecommunication equipment at a circuit level, compare energy usage of competing brands of particular pieces of telecommunication equipment, compare energy usage of a particular piece of telecommunication equipment across telecommunication sites, or compare energy usage of a particular piece of telecommunication equipment across geographic regions.

Process 800 may further include operation 808, which may represent the server providing an approved standard telecommunication list (e.g., approved standard telecommunication equipment list 712) to each central board located at a respective telecommunication site. For example, the server may provide an approved standard telecommunication equipment list to allow a selection of a particular piece of telecommunication equipment to be installed in an individual circuit in the respective telecommunication site. The server may provide an approved standard telecommunication equipment list to allow a selection of a telecommunication equipment to be repaired at the respective telecommunication site. The server may also provide an approved standard telecommunication equipment list to allow a selection of a piece of telecommunication equipment to be replaced at the respective telecommunication site.

Operation 810 may follow and represent the server receiving an alarm signal or a status signal of a power management device (e.g., a rectifier 438, a generator 440, a main bus 430). For example, the server may receive an alarm signal from a central control board that a voltage parameter is outside an optimal bound.

Process 800 may be completed at operation 812, which represents the server receiving a status signal of a control device (e.g., LVD control 426(1) or thermal control 426(2)).

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method of managing energy usage by a telecommunication network infrastructure, the method comprising:
providing, by a server, an approved standard telecommunication equipment list to each central board located at a respective telecommunication site of a telecommunication network infrastructure, the provided approved standard telecommunication equipment list tailored to a respective telecommunication site, and including respective specifications to be assigned to respective pieces of telecommunication equipment located at the respective telecommunication site of the telecommunication network infrastructure to stipulate: (1) expected current values of respective pieces of telecommunication equipment located at the respective telecommunication site of the telecommunication network infrastructure, wherein the server determines if the expected current values are different than current values identified in the respective specifications assigned to the respective pieces of telecommunication equipment located at the respective telecommunication site of the telecommunication network, or (2) attachments of respective pieces of telecommunication equipment with respective power protection devices located at the respective telecommunication site of the telecommunication network infrastructure;

receiving, by the server, respective reported current values from the plurality of central boards, wherein each reported current value is identified with a respective piece of telecommunication equipment located at a respective telecommunication site of the telecommunication network infrastructure;

integrating, by the server, the reported current values from the plurality of central boards located at the respective telecommunication sites; and providing, by the server, a Graphical User Interface (GUI) configured to allow a user to audit energy usage of each piece of telecommunication equipment of each telecommunication site provided by the reported current values.

2. The method of claim 1, further comprising providing, by the server, a Graphical User Interface (GUI) configured to display the provided approved standard telecommunication equipment list tailored to the respective telecommunication site selectable to identify a piece of telecommunication equipment to be installed in an individual circuit in the respective telecommunication site.

3. The method of claim 1, further comprising providing, by the server, a Graphical User Interface (GUI) configured to display the provided approved standard telecommunication equipment list tailored to the respective telecommunication site selectable to identify a piece of telecommunication equipment to be repaired at the respective telecommunication site.

4. The method of claim 1, further comprising providing, by the server, a Graphical User Interface (GUI) configured to display the provided approved standard telecommunication equipment list tailored to the respective telecommunication site selectable to identify a piece of telecommunication equipment to be replaced at the respective telecommunication site.

5. The method of claim 1, wherein the server is communicatively coupled with each central board located at the respective telecommunication site.

6. The method of claim 5, wherein the server is communicatively coupled with a Wide Area Network (WAN) port disposed on each central board located at the respective telecommunication site.

7. The method of claim 1, wherein each central board located at the respective telecommunication site comprises onboard removable storage storing data comprising a plurality of reported current values, each reported current value being identified with a respective piece of telecommunication equipment, and wherein the onboard removable storage is removed from each central board located at a respective telecommunication site for subsequently uploading the data stored thereon to the server; and integrating, by the server, the uploaded data comprising the plurality of reported current values from the plurality of central boards located at the respective telecommunication sites to provide a Graphical User Interface (GUI) configured to allow a user to audit energy usage of each piece of telecommunication equipment of each telecommunication site provided by the uploaded data.

8. The method of claim 7, wherein the onboard removable storage is removed from each central board located at a respective telecommunication site and the data is subsequently uploaded to the server according to a schedule or during a maintenance service of a telecommunication site.

9. The method of claim 1, wherein at least one of the plurality of central boards comprises a central monitoring board disposed in a central office or a central control board disposed in a wireless site.

10. An energy management server for a telecommunication network infrastructure, the server comprising:
a processor, and
memory storing instructions executable on the processor to perform the following acts:
provide an approved standard telecommunication equipment list to each of a plurality of central boards located at respective telecommunication sites, each of the approved standard telecommunication equipment lists being tailored for the respective telecommunication site, and including respective specifications to be assigned to respective pieces of telecommunication equipment located at the respective telecommunication site to stipulate: (1) expected current values of respective pieces of telecommunication equipment located at the respective telecommunication site, wherein the server determines if the expected current values are different than current values identified in the respective specifications assigned to the respective pieces of telecommunication equipment located at the respective telecommunication site, or (2) attachments of respective pieces of telecommunication equipment with respective power protection devices located at the respective telecommunication site;
receive a plurality of reported current values from the plurality of central boards located at the respective telecommunication sites, each reported current value being identified with a respective piece of telecommunication equipment, wherein at least one of the respective pieces of telecommunication equipment is installed in-line with a power protection device, the power protection device disposed in a primary power distribution system or a secondary power distribution system;
integrate the plurality of reported current values from the plurality of central boards located at the respective telecommunication sites; and
provide a Graphical User Interface (GUI) configured to allow a user to audit an energy usage of each piece of telecommunication equipment of each telecommunication site provided by the reported current values.

11. The server of claim 10, further configured to provide a Graphical User Interface (GUI) configured to display the provided approved standard telecommunication equipment list tailored to the respective telecommunication site selectable to identify a piece of telecommunication equipment to be installed in-line with a power protection device disposed in the primary power distribution system.

12. The server of claim 11, wherein the primary power distribution system is a battery distribution feeder bay (BDFB).

13. The server of claim 10, further configured to provide a Graphical User Interface (GUI) configured to display the provided approved standard telecommunication equipment list tailored to the respective telecommunication site selectable to identify a piece of telecommunication equipment to be installed in-line with a power protection device disposed in the secondary power distribution system.

14. The server of claim 13, wherein the secondary power distribution system is a fuse panel system.

15. One or more computer-readable storage devices comprising computer-executable instructions to implement the following acts:
provide an approved standard telecommunication equipment list to a central board located at a respective telecommunication site of a telecommunication network infrastructure, the approved standard telecommunication equipment list tailored to the respective telecommunication site, and including respective specifications to be assigned to respective pieces of telecommunication equipment located at the respective telecommunication site of the telecommunication network infrastructure to stipulate: (1) expected current values of respective pieces of telecommunication equipment located at the respective telecommunication site of the telecommunication network infrastructure, wherein the server determines if the expected current values are different than current values identified in the respective specifications assigned to the respective pieces of telecommunication equipment located at the respective telecommunication site of the telecommunication network infrastructure, or (2) attachments of respective pieces of telecommunication equipment with respective power protection devices located at the respective telecommunication site of the telecommunication network infrastructure;

receive a plurality of reported current values from the plurality of central boards, each reported current value being identified with a respective piece of telecommunication equipment, wherein at least one of the respective pieces of telecommunication equipment is installed in-line with a power protection device disposed in a power distribution system;

integrate the plurality of reported current values from the plurality of central boards located at the respective telecommunication sites; and provide a Graphical User Interface (GUI) configured to allow a user to audit an energy usage of each piece of telecommunication equipment of each telecommunication site provided by the reported current values.

16. The one or more computer-readable storage devices of claim 15, further comprising receiving an alarm signal or a status signal of a power management device.

17. The one or more computer-readable storage devices of claim 16, wherein the power management device comprises a rectifier or a generator.

18. The one or more computer-readable storage devices of claim 15, further comprising receiving a status signal of a control device.

19. The one or more computer-readable storage devices of claim 18, wherein the control device comprises a Low Voltage Disconnect (LVD) control or a thermal control.

20. The method of claim 1, wherein at least one of the respective pieces of telecommunication equipment is installed in-line with a power protection device, and the power protection device is disposed in a power distribution system.

* * * * *